Oct. 11, 1927.

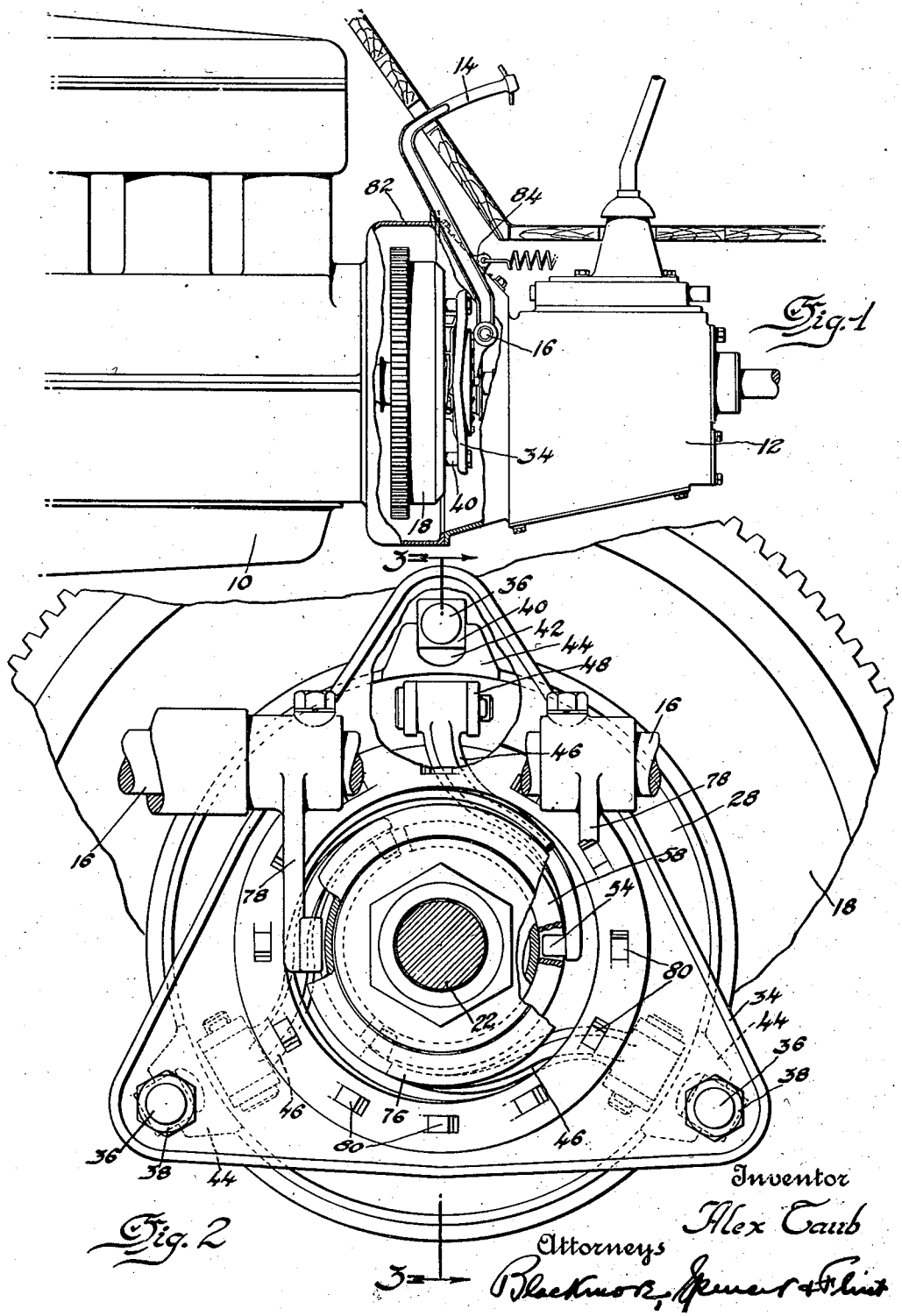

A. TAUB 1,644,759

CLUTCH

Filed April 6. 1923    2 Sheets-Sheet 2

Inventor
Alex Taub
Attorneys

Patented Oct. 11, 1927.

1,644,759

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

CLUTCH.

Application filed April 6, 1923. Serial No. 630,283.

This invention relates to clutches and similar mechanisms, and is illustrated as embodied in a plate clutch for an automobile.

An object of the invention is to provide a strong construction of light weight, arranged to dissipate rapidly the heat developed by the clutching friction, and preferably arranged for circulation of air to prevent overheating.

With this object in view, and to eliminate the weight of the usual clutch casement forming one of the driving members of the clutch, a plate which is operatively engaged by pressure-multiplying clutch-operating levers is connected to one of the clutch members by spaced posts or other connecting devices. This provides a strong but light construction which is open almost entirely around its periphery. I prefer to key the axially-movable clutch member to said posts, when used with a plate clutch, by forming in its edge slots seating over the posts.

According to another important feature of the invention, whether embodied in a clutch or some similar mechanism, air is circulated to cool the parts by providing forwardly-facing openings in one of the rotating parts, as for example the above-described plate. Preferably the air is taken from outside the clutch housing, and in one desirable arrangement the clutch housing is provided with one or more sets of louvered openings, each set being bisected by the air-circulating plate, so that the air is sucked into the housing on one side of the plate and blown out by a fan action on the other side.

The above and other features of the invention, including an arrangement of the driven clutch member with an annular heat-radiating portion projecting radially beyond the adjacent friction bands, and other novel combinations and desirable particular constructions, will be apparent from the following description of the illustrative embodiment of the invention shown in the accompanying drawings, in which:

Figure 1 is a side elevation of a clutch, with the casing broken away, assembled between an engine and transmission;

Figure 2 is a vertical transverse section through the clutch, looking forward, and showing parts of the clutch in rear elevation;

Figure 3:
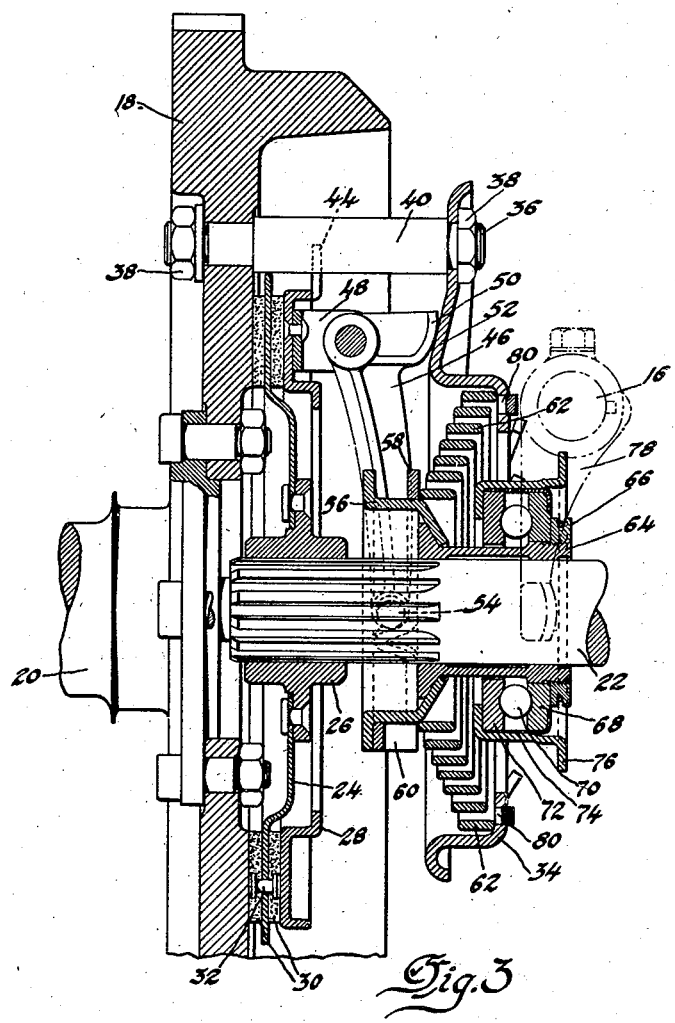
Figure 3 is a section on the line 3—3 of Figure 2, longitudinally through the clutch.
Figure 4:
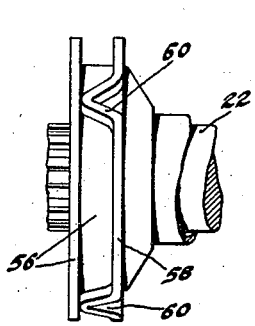
Figure 4 is a side elevation showing the arrangement of the thrust plates for moving the clutch-operating bellcrank levers.

As shown in Figure 1, the form of clutch selected for illustration is intended to be assembled between the engine 10 and transmission 12 of an automobile and to be controlled by a clutch pedal 14 secured to a rockshaft 16. One set of clutch parts is connected to a flywheel 18 bolted to the crankshaft 20 of the engine, and the other set operates a shaft 22 which forms, in effect, a continuation of the driving shaft of the transmission 12.

The clutch itself comprises relatively movable clutch members controlled by pedal 14, there being in the illustrated type of clutch a single primary clutch member and a pair of secondary clutch members, one on each side of the primary member, arranged for relative movement to grip the primary member as is usual in plate clutches. In the form shown in the drawings, the primary member is the driven element of the clutch, and is in the form of a disk 24 attached to a hub 26 splined on shaft 22 for axial movement with respect thereto, and the secondary members are the flywheel 18 and a disk 28 rotatably mounted with respect to hub 26 and having a limited axial movement, so that disks 24 and 28 both move to the left in Figure 3 when the clutch is thrown in. Friction bands 30 may be provided, and I find it convenient to attach them both to disk 24 by rivets 32. To dissipate the frictional heat as rapidly as possible, the invention provides for extending disk 24 radially beyond bands 30 and disk 28 to provide an annular heat radiating portion or fin.

According to an important feature of the invention, in order to cut the weight to a minimum, and in lieu of the usual casement on the flywheel inclosing the slidable disks, a triangular plate 34 is rigidly attached to, and spaced from, flywheel 18 by posts 36 held by nuts 38 threaded on their opposite ends, and each of which has a thick central portion 40 (either integral with the post or formed by a surrounding sleeve), providing shoulders engaging respectively flywheel 18 and plate 34. The central portion 40 of each post may be made square in cross-section, and disk 28 provided with slots 42 embracing the squared posts, the slots preferably being formed in lugs 44 projecting radially from the disk. By this arrangement, disk 28 is keyed by posts 36 to flywheel 18 to turn therewith.

The clutch is operated by levers 46 pivoted on brackets 48 secured to disk 28, the levers having wedge arms 50 arranged to engage wedge surfaces on plate 34 made by bending the plate to form wedge or conical portions 52. The ends of the levers are in the form of pins 54 held between a flange on a member 56 and a ring 58, in engagement with abutments formed by bending the ring at spaced points 60. A spring 62 urges ring 58 to the left (Figure 3) to throw the clutch in.

Member 56 seats against a head on a sleeve 64 surrounding shaft 22, on the end of which is threaded a retainer 66 holding one ring 68 of a thrust bearing comprising balls 70, the other ring 72 being held in a cup-shaped member 74 having a flange 76 at its rim or head, which is engaged by a yoke comprising the in-turned ends of arms 78 secured to the pedal-operated rockshaft 16.

Figure 5:
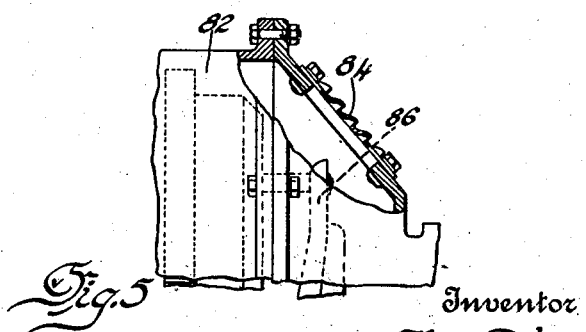
Figure 5 is a view corresponding to part of Figure 1, but showing a set of louvered openings on a larger scale.

In order to circulate air through the clutch as above described, portions of plate 34 are displaced by a punching operation to form forwardly facing openings 80, forcing the air by a fan action from the right of the plate (Figure 1) to the left. The clutch housing 82 may be provided with one or more sets of louvered openings 84, so that air enters at the right side of each set (Figures 1 and 5) and is blown out at the left side after circulating through the clutch mechanism. Openings 84 may be formed by a punching operation directly in the clutch housing, or in a plate attached to the housing as shown.

In operation, the clutch is normally held engaged by springs 62. When pedal 14 is depressed, arms 78 operate through the thrust bearing to move sleeve 64, and therefore member 56, to the right (Figure 3), compressing spring 62 and disengaging the clutch. When the pedal is released, spring 62 rocks levers 46, causing arms 50 to wedge against surfaces 52 to move disks 28 and 24 axially to the left to bring the two disks and the flywheel into clutching engagement with one another.

While one form of clutch embodying my invention has been described in detail, it is not my intention to limit the scope of the invention to that form, or otherwise than by the terms of the appended claims.

I claim:

1. A friction clutch comprising a driving disc, a plate spaced from the driving disc and secured thereto by a plurality of circumferentially spaced connecting devices, clutch members between said disc and plate, a fixed casing enclosing the clutch, openings in the plate facing the direction of rotation, openings in the casing, the position of the parts being such that a cooling air current is maintained through some of the casing openings, through the plate, around the clutch elements and out through others of the casing openings.

2. In means for cooling a friction clutch, relatively rotatable clutch elements, a fixed casing therefor, means associated with one of the clutch elements to produce an air current, and spaced inlet and outlet openings in the casing to accommodate said air current.

3. A cooling device for clutches comprising a rigid casing and a friction clutch enclosed thereby, spaced inlet and outlet openings in the casing, a rotatable member associated with the clutch having openings directed in the direction of rotation whereby an air current is produced through the casing, around the clutch and again out through the casing.

4. A cooling device for clutches comprising a rigid casing, a friction clutch therein, the casing having an opening therein provided with louvers, the clutch including a rotating apertured plate functioning to create an air current around the clutch elements, the plane of the plate intersecting the casing opening so that certain of the louvers admit air and others exhaust air.

5. A clutch comprising, in combination, a rotary plate having openings facing in the direction of rotation, and a clutch housing having inlet and outlet air openings respectively on opposite sides of the plane of said plate.

6. A clutch comprising, in combination, a rotary plate having openings facing in the direction of rotation, and a clutch housing having one or more sets of louvered openings intersected by the plane of said plate.

7. A clutch comprising, in combination, a flywheel, a plate having air-circulating openings, spaced posts connecting the flywheel and plate, axially-shiftable clutch disks between the flywheel and plate, and a clutch and flywheel housing having louvered openings on opposite sides of the plane of the plate.

In testimony whereof I affix my signature.

ALEX TAUB.